United States Patent [19]

Silchenstedt

[11] Patent Number: 4,718,145
[45] Date of Patent: Jan. 12, 1988

[54] APPARATUS AND METHOD FOR EVISCERATING SCALLOPS

[75] Inventor: Albert B. Silchenstedt, Alamorgorda, N. Mex.

[73] Assignee: Southern Seafoods, Cape Canaveral, Fla.

[21] Appl. No.: 830,379

[22] Filed: Feb. 18, 1986

[51] Int. Cl.$^4$ .............................................. A22C 29/04
[52] U.S. Cl. .......................................... 17/45; 17/53; 17/73
[58] Field of Search ....................... 17/53, 45, 46, 73

[56] References Cited

U.S. PATENT DOCUMENTS

| | | |
|---|---|---|
| 2,617,532 | 11/1952 | Gorton . |
| 2,827,383 | 3/1958 | Gorton . |
| 3,129,456 | 4/1964 | Renfroe . |
| 3,177,522 | 4/1965 | Renfroe . |
| 3,180,158 | 4/1965 | Morris . |
| 3,257,684 | 6/1966 | Wenstrom . |
| 3,434,586 | 3/1969 | Morris . |
| 3,528,124 | 9/1970 | Wenstrom . |
| 3,562,855 | 2/1971 | Willis . |
| 3,619,855 | 11/1971 | Willis . |
| 3,662,431 | 5/1972 | Willis . |
| 3,662,432 | 5/1972 | Wenstrom . |
| 3,665,554 | 5/1972 | Wenstrom . |
| 3,665,555 | 5/1972 | Willis . |
| 3,683,458 | 8/1972 | Wenstrom . |
| 3,829,933 | 8/1974 | Lambert ................................. 17/53 |
| 3,864,788 | 2/1975 | Willis . |
| 3,945,084 | 3/1976 | Willis . |
| 4,121,322 | 10/1978 | Rutledge ................................. 17/73 |
| 4,330,904 | 5/1982 | Lambert ................................. 17/74 |

FOREIGN PATENT DOCUMENTS 247915 7/1963 Australia ................................. 17/73

Primary Examiner—Willie G. Abercrombie
Attorney, Agent, or Firm—Arnold, White & Durkee

[57] ABSTRACT

An apparatus and method for eviscerating scallops is provided which uses a vibrating table to move the scallops along a bed of rotating rollers. The rollers pinch the viscera between adjacent rollers and remove it from the adductor muscle.

15 Claims, 5 Drawing Figures

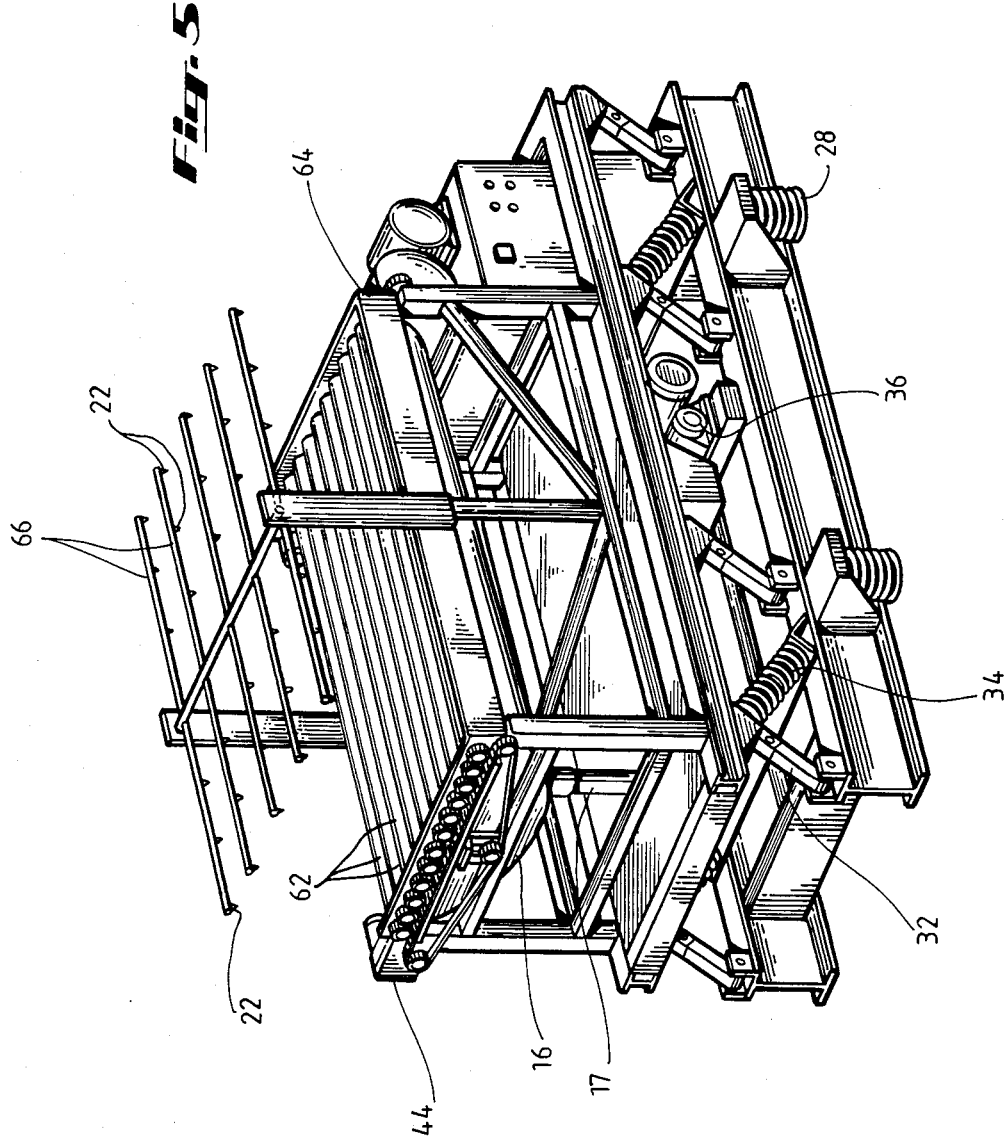

APPARATUS AND METHOD FOR EVISCERATING SCALLOPS

BACKGROUND OF THE INVENTION

The present invention relates to apparatus and methods for preparing shellfish for consumption and, more particularly, relates to apparatus and methods for eviscerating shellfish such as scallops.

In order to prepare shellfish for human consumption, it is necessary to remove the edible portion from the shell. With bivalves such as scallops, the edible portion comprises the adductor muscle which open and closes the shells. Various methods have been devised for separating the shells and dislodging the adductor muscle therefrom. Several such methods are disclosed in U.S. Pat. No. 3,528,124 to Wenstrom et al. These methods generally comprise shocking the shellfish by striking it against an immovable object, heating the shellfish for a time sufficient to separate the adductor muscle from the shells but not so long as to cook the muscle, and shocking the shellfish a second time against an object to separate the shells and the adductor muscle.

However, once the adductor muscle has been separated from the shells, further processing is required before it is suitable for consumption. The viscera of the shellfish surrounds the adductor muscle and generally must be removed before the muscle is cooked. One of the challenges faced in removing the viscera is to completely remove the viscera without removing any of the edible meat. Additionally, inasmuch as the scallops are relatively small, it is important to quickly and efficiently remove the viscera in order to make the process economical.

U.S. Pat. No. 3,257,684 to Wenstrom et al. discloses a method and apparatus for separating the adductor muscle of the scallop from the viscera. In the device disclosed in that patent, the adductor muscle with the viscera attached thereto is placed over an opening in a support, such opening being of a size about the same size as the muscle to be removed. The muscle is then forced through the opening to shear the viscera from the muscle. In one embodiment disclosed in the patent, the muscle is forced through the opening with a rod after the muscle is aligned with the opening by hand. In another, embodiment, a provision is made for holding the viscera about the opening while the aligned muscle is forced through the opening. Other embodiments include means for forcing the muscle through the opening by differential pressure, such as by a vacuum in one instance and by air pressure or hydraulic pressure in another instance.

U.S. Pat. No. 3,129,456 to Renfroe discloses an automatic process and apparatus for eviscerating scallops. In this process, a generally cylindrical viscera bearing scallop muscle is fed in an axial direction into the apparatus where the viscera is severed from the muscle. The severing is performed by a pair of cutting elements relatively movable in cooperative shearing relationship. In one embodiment, a knife is moved across the face of a perforated wall in conformity therewith to affect a shearing action between the knife and the edges of the perforations. The perforations are too small to permit passage of the muscles but the viscera moves freely through the perforations to be discharged. Suction can be applied to the opposite side of the perforated wall to facilitate severance and removal of the viscera. The muscles are rotated about their axes until all of the viscera is removed.

A further apparatus and method for eviscerating scallops is disclosed in U.S. Pat. No. 3,562,855 to Willis. In this process, scallop muscles and attached viscera are positioned on the upper surface of an inclined path formed by a plurality of rollers. Viscera is pulled from the scallop muscle and through the nip formed by adjacent rollers by rotating the upper portion of adjacent rollers toward each other. Detached viscera is cleaned from the rollers below the inclined path. The advance of the scallop muscles down the path is controlled by intermittently rotating the upper portion of adjacent rollers away from each other to permit the lower of the adjacent rollers to advance the muscle down the path and by spraying a flow of fluid such as water on at least some of the muscles on the path to affect their rate of movement down the path.

Still another method and apparatus for eviscerating scallops is disclosed in U.S. Pat. No. 3,665,554 to Wenstrom et al. In this process, the adductor muscles and attached viscera are delivered to an elongated stationary expanded metal plate. The metal plate is perforated and has an undulated irregular surface providing closely spaced projections. A plurality of spaced, flexible pusher plates cooperate with the perforated metal plate to remove the viscera from the adductor muscles as they are pushed along the plate. As a muscle and viscera are pushed along the plate, the viscera tends to fall through the openings in the plate and portions of the viscera are caught and pinched by the edge of the pusher plate against the projections of the metal plate.

The '554 patent discloses a second method and apparatus for eviscerating scallops in which a series of contiguous rollers are geared together so that adjacent rollers rotate in opposite directions. The rollers are rotated in one direction for about one and one-half seconds and then are reversed in direction for about one and one-half seconds. The rollers are formed from metal and have an embossed plastic covering of a nature such as to grip the viscera without damage to the scallop meat.

The '554 patent discloses a further method and apparatus for eviscerating scallops in which the contiguous rollers are arranged to be rotated in the same direction with or without reversal. The rollers can have either smooth or embossed surfaces. Alternating rollers are arranged to rotate at about twenty percent more speed than the other rollers. Accordingly, as the scallop meats are deposited between a pair of rollers, the faster rotating roller pulls the viscera against the frictional resistance of the slower moving roller to tear the viscera away from the scallop muscle and passes the viscera downwardly between the two rollers. The slower rotating roller can then advance the scallop meat down the bed of rollers where further viscera is removed.

While each of these processes provides a means for removing the viscera from the edible adductor muscle, they are still plagued with certain problems. For example, in the automatic processes which utilize a series of rollers, the bed of rollers generally has to be inclined to provide a driving force to move the scallops along the bed. However, it is still common for scallops to become stuck in a valley between a pair of rollers such that they do not progress down the eviscerating apparatus. Accordingly, what is needed in the art is a method and apparatus for eviscerating scallops which includes a means for propelling the scallops along the length of the apparatus. Such an apparatus and method are disclosed and claimed herein.

SUMMARY OF THE INVENTION

The present invention provides a new apparatus and method for eviscerating scallops. In a preferred embodiment, the apparatus comprises a plurality of axially aligned rollers transversely mounted in a supporting frame. A drive mechanism is provided for causing the rollers to rotate within the frame. The rollers are covered with an embossed surface such as friction tape which allows them to grip the viscera and pull it from the adductor muscle. A plurality of nozzles are located above the rollers to spray water which helps to lubricate the rollers and cause the viscera to fall from the rollers into a trough positioned below the eviscerator. The trough collects the detached viscera and removes them for disposal.

A first end of the frame containing the rollers acts as a receiving zone onto which fresh scallops are fed. As the scallops progress from roller to roller down the eviscerator, the rotating rollers grab the viscera and pull it from the adductor muscle and discharge it into the trough below. The viscera is usually removed in several small pieces.

The frame containing the rollers is mounted on a vibrating mechanism which creates the force that causes the scallops to progress from roller to roller. The vibrating mechanism is operated at a frequency and amplitude so as to cause the scallops to progress down the eviscerator at a rate which allows for complete and efficient removal of the viscera from the adductor muscle by the rollers.

In a second preferred embodiment, the rollers are mounted longitudinally within the support frame. Accordingly, the scallops travel along the length of the rollers as they progress down the eviscerator rather than from roller to roller. The vibrating mechanism provides the force necessary to move the scallops.

After the entire viscera has been removed from the adductor muscle, the scallops are discharged from the end of the eviscerator for further processing.

BRIEF DESCRIPTION OF THE DRAWINGS

FIG. 5 is a perspective view of a second preferred embodiment of the present invention.

DETAILED DESCRIPTION OF THE PREFERRED EMBODIMENT

The present invention provides an improved apparatus and method for eviscerating scallops which utilizes a vibrating table as the primary motivating force to move the scallops down the separator. The invention is best understood by reference to the accompanying drawings in which like parts are designated with like numerals throughout.

Figure 1:
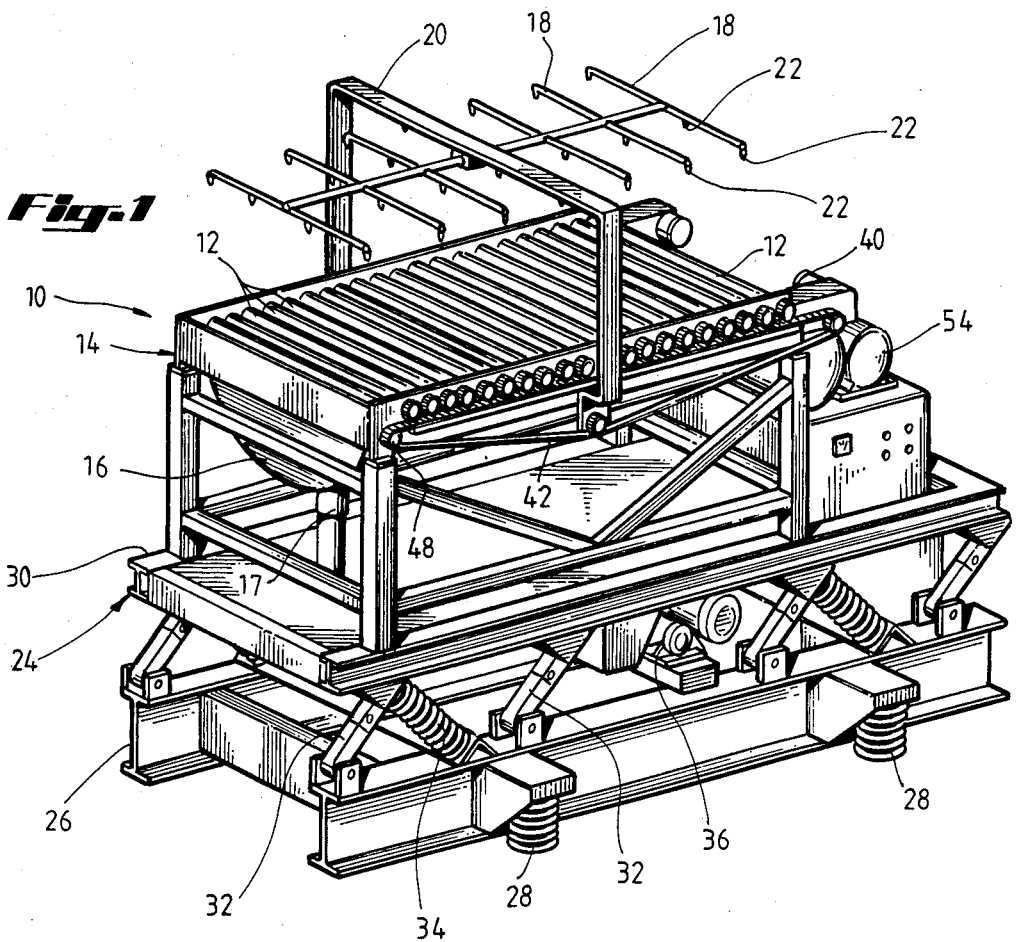
FIG. 1 is a perspective view of an eviscerating apparatus built in accordance with the teachings of the present invention.

Referring first to FIG. 1, a preferred embodiment of the present invention is illustrated in a perspective view. Eviscerator 10 includes a plurality of adjacent rollers 12 which are mounted in a support frame 14. Rollers 12 form a bed upon which scallops with attached viscera are placed. The scallops can be placed on eviscerator 10 by hand or in an automated system, can be deposited by a conveyor belt or other suitable means. As rollers 12 rotate, the viscera is pulled from the adductor muscle of the scallop and is discharged into through 16 which is mounted below rollers 12 and supported by frame 14.

A plurality of spray bars 18 are positioned above rollers 12. Spray bars 18 are supported by a frame 20 or any other suitable means. A plurality of nozzles 22 are formed in the bottom of spray bars 18. A source of water is connected to spray bars 18 through tubing (not shown) and provides a fine spray which is discharged through nozzles 12 and causes the viscera, as it is pulled from the adductor muscle, to be dropped into through 16 below rollers 12. A chute 17 is positioned in the bottom of trough 16 to remove the viscera.

Support frame 14 is mounted on a vibrating table 24 which provides the primary driving force which causes scallops to progress down the bed formed by rollers 12. As the scallops reach the end of the bed, they are discharged onto a conveyor (not shown) or other suitable means which transports them for further processing.

Vibrating table 24 includes a base 26 which is stabilized by isolation assemblies 28. A platform 30 is mounted above base 26 by supports 32 and springs 34. A vibratory drive mechanism 36 causes platform 30 to vibrate with respect to base 26.

While a preferred embodiment of vibrating table 24 has been illustrated, it will be appreciated that any type of vibrating table available and well know to those skilled in the art can be used. The table must be capable of vibrating at a frequency and amplitude which is sufficient to cause the scallops to progress down the eviscerator but not so great as to cause the scallops to fly away from the table or travel so rapidly that the viscera cannot be removed.

Rollers 12 are spaced from each other a sufficient distance to allow viscera to be pinched and pulled therethrough but not so far as to allow the adductor muscle to become wedged between the rollers.

Figure 3:
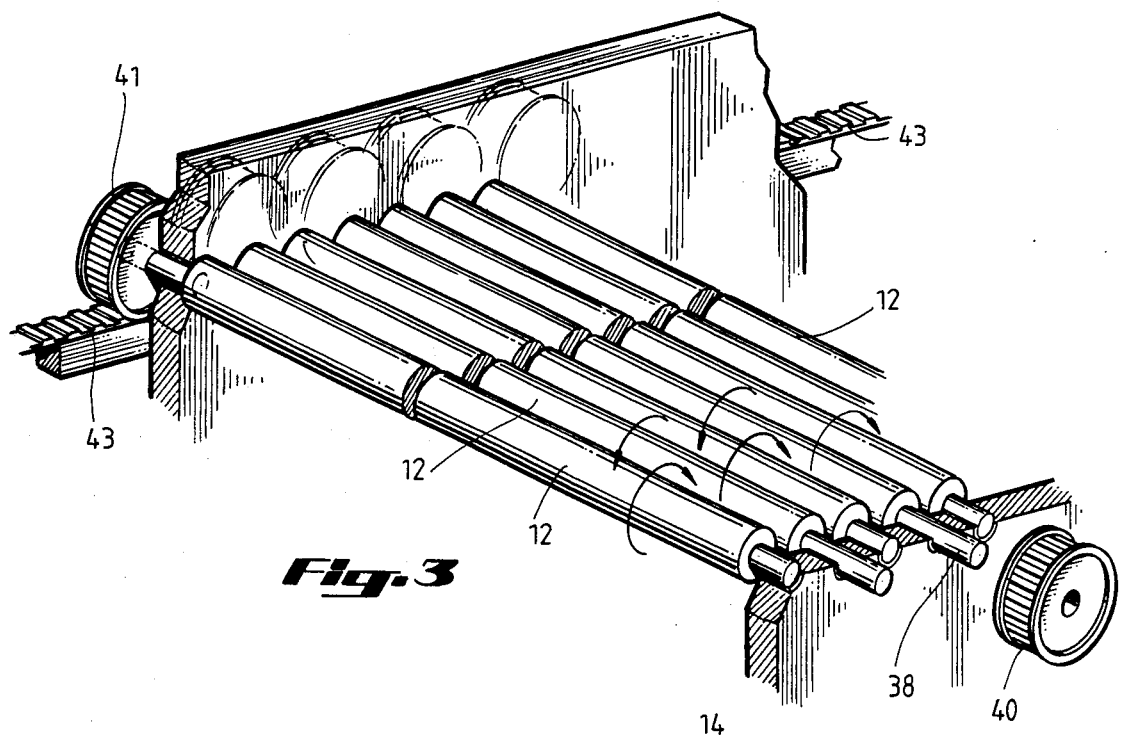
FIG. 3 is a perspective view of a portion of the roller section of the eviscerator.
Figure 4:
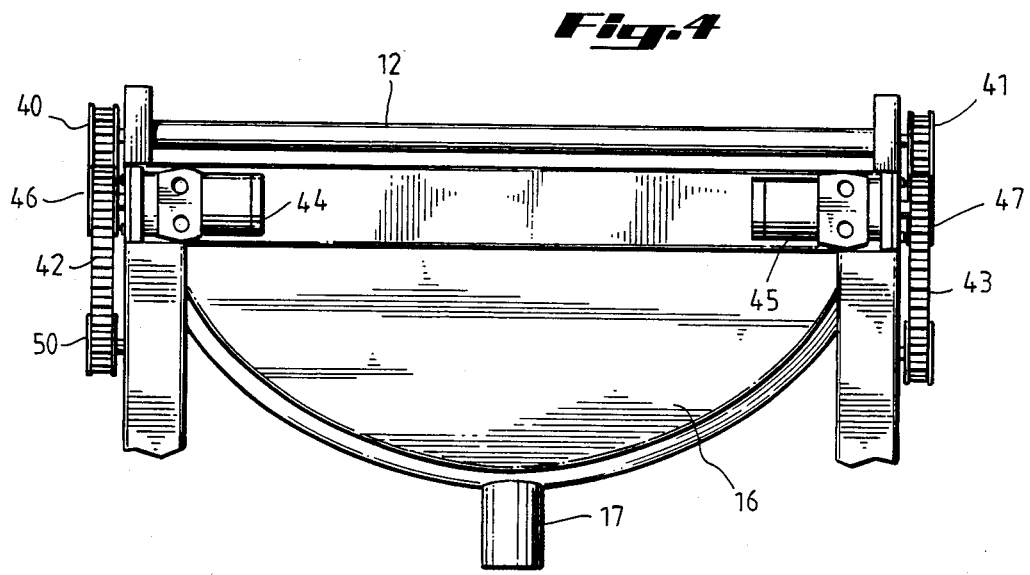
FIG. 4 illustrates the driving mechanism for the rollers and the trough for collecting the attached viscera.

As can be seen in FIG. 3, each roller 12 includes a drive shaft 38 and a sprocket 40 or 41. Sprockets 40 and 41 are laced on alternating rollers. The sprockets 40 are positioned on one side of support frame 14 while sprockets 41 are positioned on the other side of support frame 14. Accordingly, sprockets 40 can be driven in one direction while sprockets 41 are driven in the other direction thus causing alternating rollers to rotate in opposite directions. Alternatively, sprockets 40 and 41 can be driven in the same direction but at differing speeds so as to allow the faster rotating rollers to pinch the viscera of the scallop against the slower rotating roller and pull it from the adductor muscle.

Sprockets 40 are driven by a drive belt 42 (see FIG. 2) while sprockets 41 are driven by a drive belt 43. In the preferred embodiment, drive belts 42 and 43 are ribbed rubber belts and sprockets 40 and 41 are designed to correspond to the ribs. It will be appreciated that other type of sprockets and drive belts or drive chains could also be used to rotate rollers 12.

Figure 2:
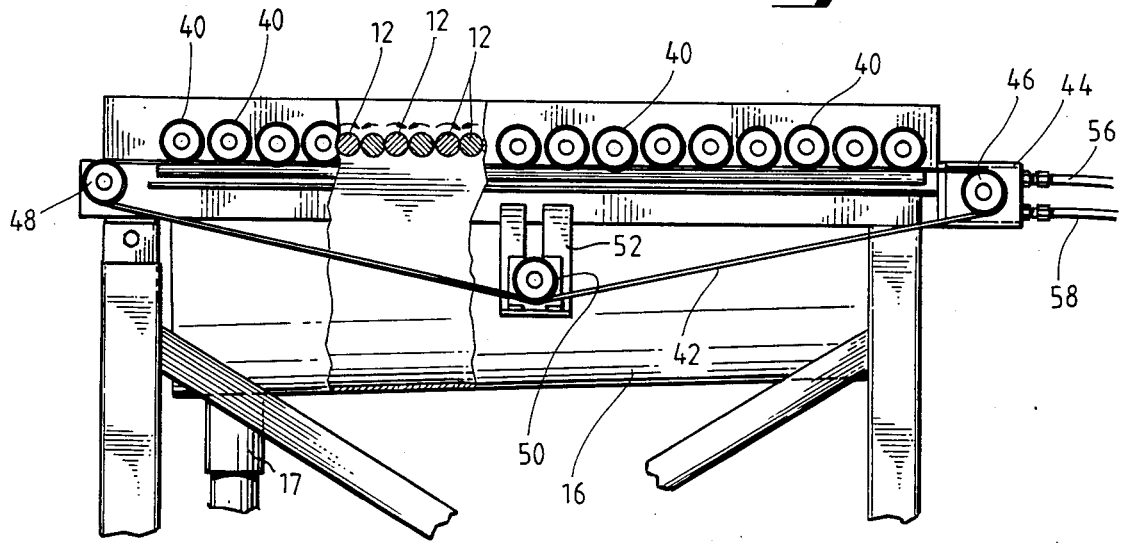
FIG. 2 is a side plan view of a portion of the eviscerating apparatus of FIG. 1 partially broken away to show the plurality of rotating rollers.

With reference to FIG. 2, drive belt 42 and sprockets 40 are a hydraulic motor 44 which turns a sprocket 46. A second sprocket 48 is positioned at the other end of support frame 14 for reversing the direction of belt 42. An adjustable sprocket 50 is mounted in frame 52 which depends from support frame 14. The position of sprocket 50 can be adjusted to control the tension in drive belt 42.

Hydraulic motor 44 is driven by a hydraulic pump 54 (see FIG. 1) mounted on an end of support frame 14. Fluid is provided to motor 44 through hoses 56 and 58 which are connected to pump 54. By simply reversing hoses 56 and 58, the direction of motor 44 can be reversed which causes the rollers to rotate in the opposite direction.

A similar drive mechanism is provided for driving sprockets 41 which are positioned on the opposite side of support frame 14.

It will be appreciated from the foregoing that the present invention provides a simple drive mechanism which can be adapted to rotate all of the rollers in the same direction or to rotate alternating rollers in opposite directions by simply rearranging the hoses 56 and 58. Additionally, by placing a restrictor valve in the hoses to one of the drive motors, the sprockets and rollers driven by that motor can be made to rotate at a slower speed.

It will be appreciated by those skilled in the the art that other drive mechanisms and arrangements can also be used. For example, Geneva wheels could be included to provide intermittent rotation of the rollers.

Reference is next made to FIG. 5 which illustrates a second preferred embodiment of the present invention. In this embodiment, rollers 62 are positioned longitudinally within support frame 64. Accordingly, as scallops progress down the table, they advance along the length of the rollers rather than from roller to roller.

The remaining components of this embodiment are essentially identical to the embodiment of FIGS. 1–4. Suitable adjustments are made to mount hydraulic motor 44 on the side of support frame 64 to rotate rollers 62. Additionally, the arrangement of spray bars 66 above the eviscerator can be changed to run lengthwise, as illustrated, rather than crosswise.

In operation, scallops are fed onto the bed formed from rollers 12 or 62 which are rotated to remove the viscera. Vibrating table 24 vibrates the bed to cause the scallops to move along the length thereof to a point where they can be discharged.

It will be appreciated from the foregoing that the present invention provides unique apparatus and methods for eviscerating scallops which can easily be adjusted to provide different operating conditions. Additionally, the vibrating table provides a primary drive force which ensures that the scallops will progress down the eviscerator in a constant, uniform fashion.

While the present invention has been described with references to the presently preferred embodiment, the invention may be embodied in other specific forms without departing form its spirit or essential characteristics. Thus, the described embodiments are to be considered in all respects only illustrative and not restrictive. The scope of the invention is therefore, indicated by the appended claims rather than by the foregoing description, and all modifications or changes which come within the meaning and range of equivalency of the claims are to be embraced within their scope.

What is claimed is:

1. An apparatus for eviscerating scallops comprising:
   a plurality of adjacent, axially aligned rollers mounted in a frame forming a bed along which the scallops travel;
   drive means for rotating said rollers so as to pinch viscera on said scallops between adjacent rollers to remove the viscera from the scallops; and
   means for vibrating said bed of rollers to move said scallops along the bed.

2. An apparatus for eviscerating scallops as defined in claim 1, wherein said bed is mounted on a vibrating table.

3. An apparatus for eviscerating scallops as defined in claim 2, wherein said table is supported on a plurality of springs.

4. An apparatus for eviscerating scallops as defined in claim 1 wherein said rollers are positioned crosswise in said bed.

5. An apparatus for eviscerating scallops as defined in claim 1, wherein said rollers are positioned lengthwise in said bed.

6. An apparatus for eviscerating scallops as defined in claim 1, wherein adjacent rollers are rotated in opposite directions.

7. An apparatus for eviscerating scallops as defined in claim 1, wherein alternating rollers are rotated at different speeds.

8. An apparatus for eviscerating scallops as defined in claim 1, wherein said drive means comprises a hydraulic motor and a ribbed drive belt.

9. An apparatus for eviscerating scallops as defined in claim 8, wherein said drive belt is connected to alternating rollers and said drive means further comprises a second hydraulic motor and drive belt attached to the other rollers.

10. An apparatus for eviscerating shellfish comprising:
    a plurality of adjacent, axially aligned rollers mounted in a frame to form a bed along which shucked shellfish travel to be processed;
    drive means for rotating said rollers to pinch viscera between adjacent rollers and remove the viscera from said shucked shellfish; and
    a vibrating table supported by a plurality of flexible springs, said bed being mounted on said vibrating table such that said bed can vibrate to move the shucked shellfish along said bed.

11. An apparatus for eviscerating shellfish as defined in claim 10, wherein said rollers are positioned crosswise in said bed.

12. An apparatus for eviscerating shellfish as defined in claim 10, wherein said rollers are positioned lengthwise in said bed.

13. An apparatus for eviscerating shellfish as defined in claim 10, wherein adjacent rollers are rotated in opposite directions.

14. An apparatus for eviscerating shellfish as defined in claim 10, wherein said drive means comprises a hydraulic motor and a drive belt connected to alternating rollers.

15. A method for eviscerating scallops comprising the steps of:
    placing shucked scallops on a bed of rotating rollers which are capable of removing the viscera; and
    vibrating said bed so as to cause said scallops to progress along said bed.

* * * * *